United States Patent
Ogawa et al.

(10) Patent No.: US 11,915,885 B2
(45) Date of Patent: Feb. 27, 2024

(54) ELECTRODE FOIL FOR ELECTROLYTIC CAPACITOR, ELECTROLYTIC CAPACITOR, AND METHOD FOR MANUFACTURING ELECTROLYTIC CAPACITOR

(71) Applicant: Panasonic Intellectual Property Management Co., Ltd., Osaka (JP)

(72) Inventors: Miwa Ogawa, Osaka (JP); Naomi Kurihara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 31 days.

(21) Appl. No.: 17/637,199

(22) PCT Filed: Sep. 4, 2020

(86) PCT No.: PCT/JP2020/033684
§ 371 (c)(1),
(2) Date: Feb. 22, 2022

(87) PCT Pub. No.: WO2021/065356
PCT Pub. Date: Apr. 8, 2021

(65) Prior Publication Data
US 2022/0301786 A1   Sep. 22, 2022

(30) Foreign Application Priority Data
Sep. 30, 2019 (JP) ................................ 2019-180470

(51) Int. Cl.
*H01G 9/07* (2006.01)
*H01G 9/00* (2006.01)
(Continued)

(52) U.S. Cl.
CPC ............. *H01G 9/07* (2013.01); *H01G 9/0032* (2013.01); *H01G 9/035* (2013.01); *H01G 9/042* (2013.01)

(58) Field of Classification Search
CPC ........... H01G 9/04; H01G 9/0032; H01G 9/07
See application file for complete search history.

(56) References Cited

U.S. PATENT DOCUMENTS 3,113,253 A * 12/1963 Ishikawa et al. .... H01G 9/0032
361/313
3,365,626 A *  1/1968 Mohler ................ H01G 9/0032
257/595

(Continued)

FOREIGN PATENT DOCUMENTS

| JP | 2015-115475 | 6/2015 |
| WO | 2017/154461 | 9/2017 |
| WO | 2018/180029 | 10/2018 |

OTHER PUBLICATIONS

International Search Report of PCT application No. PCT/JP2020/033684 dated Nov. 24, 2020.

*Primary Examiner* — David M Sinclair
(74) *Attorney, Agent, or Firm* — Rimon P.C.

(57) ABSTRACT

An electrode foil for an electrolytic capacitor includes: an anode body including a first metal; a first dielectric layer covering at least a part of the anode body and including an oxide of the first metal; and a second dielectric layer covering at least a part of the first dielectric layer and including an oxide of a second metal. The first metal includes at least one selected from the group consisting of titanium, tantalum, niobium, and aluminum. And the second metal includes at least one selected from the group consisting of silicon, zirconium, hafnium, and tantalum. A thickness $T2$ of the second dielectric layer is smaller than a thickness $T1$ of the first dielectric layer.

9 Claims, 2 Drawing Sheets

(51) Int. Cl.
*H01G 9/035* (2006.01)
*H01G 9/042* (2006.01)

(56) References Cited

U.S. PATENT DOCUMENTS

| | | | |
|---|---|---|---|
| 2008/0094775 A1* | 4/2008 | Sneh | H01G 9/055 29/25.42 |
| 2013/0342966 A1* | 12/2013 | Horio | H01G 9/004 29/25.03 |
| 2014/0313638 A1* | 10/2014 | Kato | H01G 9/0032 29/25.03 |
| 2018/0174751 A1* | 6/2018 | Saeki | H01G 4/12 |
| 2018/0358178 A1* | 12/2018 | Saeki | H01G 9/0425 |
| 2018/0358181 A1 | 12/2018 | Ogawa et al. | |
| 2020/0006011 A1 | 1/2020 | Ogawa et al. | |

* cited by examiner

ELECTRODE FOIL FOR ELECTROLYTIC CAPACITOR, ELECTROLYTIC CAPACITOR, AND METHOD FOR MANUFACTURING ELECTROLYTIC CAPACITOR

TECHNICAL FIELD

The present invention relates to an electrode foil for an electrolytic capacitor, an electrolytic capacitor, and a method for manufacturing an electrolytic capacitor.

BACKGROUND

In conventional electrolytic capacitors, a base material including a valve metal whose surface is roughened is subjected to chemical conversion (anodizing) to form a dielectric layer including an oxide of the valve metal on a surface with fine irregularities of the base material.

Meanwhile, in PTL 1, it is proposed, for the purpose of increasing capacitance and reducing a leak current, to form another dielectric layer, including an oxide of a valve metal different from the valve metal included in the dielectric layer and an additive such as carbon, on the dielectric layer.

CITATION LIST

Patent Literature

PTL 1: Unexamined Japanese Patent Publication No. 2015-115475

SUMMARY

In the method of PTL 1, however, it may not be possible to simultaneously realize an increase in capacitance and an improvement in withstand voltage.

Meanwhile, in Unexamined Japanese Patent Publication No. 2015-115475, it is proposed, for the purpose of increasing capacitance and reducing a leak current, to form another dielectric layer, including an oxide of a valve metal different from the valve metal included in the dielectric layer and an additive such as carbon, on the dielectric layer.

SUMMARY

In the method of Unexamined Japanese Patent Publication No. 2015-115475, however, it may not be possible to simultaneously realize an increase in capacitance and an improvement in withstand voltage.

An electrode foil for an electrolytic capacitor according to first aspect of the present invention includes: an anode body including a first metal; a first dielectric layer covering at least a part of the anode body and including an oxide of the first metal; and a second dielectric layer covering at least a part of the first dielectric layer and including an oxide of a second metal. The second metal is different from the first metal. The first metal includes at least one selected from the group consisting of titanium, tantalum, niobium, and aluminum, and the second metal includes at least one selected from the group consisting of silicon, zirconium, hafnium, and tantalum. And a thickness T2 of the second dielectric layer is smaller than a thickness T1 of the first dielectric layer.

An electrolytic capacitor according to second aspect of the present invention includes: the electrode foil according to the first aspect; and a solid electrolyte layer covering at least a part of the second dielectric layer of the electrode foil. The solid electrolyte layer includes a conductive polymer.

A method for manufacturing an electrolytic capacitor according to third aspect of the present invention includes a first step and a second step as follows. The first forming a first dielectric layer including an oxide of a first metal by anodizing a base material including the first metal so that the first dielectric layer covers at least a part of the base material. The second step is forming a second dielectric layer including an oxide of a second metal and having a thickness T2 smaller than a thickness T1 of the first dielectric layer so that the second dielectric layer covers at least a part of the first dielectric layer to obtain an electrode foil. The second metal is different from the first metal. The first metal includes at least one selected from the group consisting of titanium, tantalum, niobium, and aluminum. And the second metal includes at least one selected from the group consisting of silicon, zirconium, hafnium, and tantalum.

According to the present invention, an electrolytic capacitor having a large capacitance and excellent withstand voltage can be obtained.

DESCRIPTION OF EMBODIMENT

[Electrode Foil for Electrolytic Capacitor]

Figure 1:
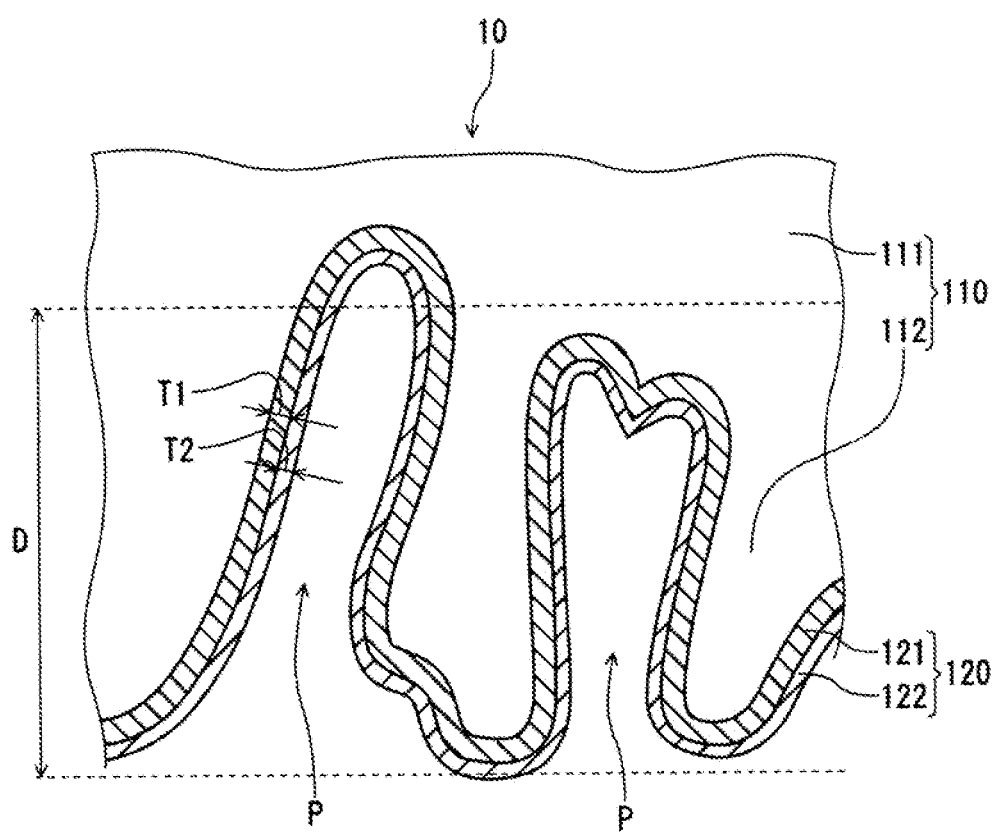
FIG. 1 is a sectional view schematically illustrating a surface portion of an electrode foil according to an exemplary embodiment of the present invention.

An electrode foil for an electrolytic capacitor according to an exemplary embodiment of the present invention includes: an anode body including a first metal; a first dielectric layer covering at least a part of the anode body and including an oxide of the first metal; and a second dielectric layer covering at least a part of the first dielectric layer and including an oxide of a second metal. The second metal is different from the first metal. The first metal includes at least one selected from the group consisting of titanium (Ti), tantalum (Ta), niobium (Nb), and aluminum (Al). The second metal includes at least one selected from the group consisting of silicon (Si), zirconium (Zr), hafnium (Hf), and tantalum (Ta). A thickness T2 of the second dielectric layer is smaller than a thickness T1 of the first dielectric layer.

By covering at least a part of the first dielectric layer with the second dielectric layer, a withstand voltage of the electrolytic capacitor is improved. Furthermore, by making the thickness T2 of the second dielectric layer smaller than the thickness T1 of the first dielectric layer, an electrolytic capacitor having a large capacitance can be obtained at low-cost regardless of the level of a dielectric constant of the second dielectric layer. In other words, by making the thickness T2 of the second dielectric layer smaller than the thickness T1 of the first dielectric layer, a good balance between excellent withstand voltage and large capacitance can be obtained, and thus an electrolytic capacitor having a large CV value, which will be described later, can be obtained.

When the first metal includes at least one selected from the group consisting of Ti, Ta, Nb, and Al, the first dielectric layer can be easily formed by anodizing. From the viewpoint of being more advantageous in cost, the first metal preferably includes Al. The oxide of the first metal (first dielectric layer) includes at least one selected from the group consisting of $TiO_2$, $Ta_2O_5$, $Nb_2O_5$, and $Al_2O_3$. By forming such a first dielectric layer so as to be thick, it becomes advantageous to reduce the process cost.

The second metal includes at least one selected from the group consisting of Si, Zr, Hf, and Ta. In this case, the second dielectric layer that is dense and has a uniform thickness can be easily formed by an atomic layer deposition (ALD) method. From the viewpoint of easily forming the second dielectric layer that has a small thickness and brings a high withstand voltage, the second metal preferably includes Si. From the viewpoint of increasing capacitance, the second metal preferably includes Hf. The oxide of the second metal (second dielectric layer) includes at least one selected from the group consisting of $SiO_2$, $ZrO_2$, $HfO_2$, and $Ta_2O_5$. When the second dielectric layer includes two or more oxides of the second metal, the oxides may be mixed, or may be included in respective layers of multi layers. By forming a thin film of the oxide of the second metal on the first dielectric layer, the withstand voltage of the electrolytic capacitor can be increased at low cost. From the viewpoint of being advantageous for increasing the capacitance of the electrolytic capacitor, the oxide of the second metal preferably has a higher relative dielectric constant than the oxide of the first metal.

A ratio T1/T2 of the thickness T1 of the first dielectric layer to the thickness T2 of the second dielectric layer is preferably more than 1 and less than or equal to 20. When T1/T2 is less than or equal to 20, the withstand voltage can be easily improved at low cost. From the viewpoint of a balance among cost reduction, an increase in capacitance, and withstand voltage, T1/T2 more preferably ranges from 1.25 to 10, inclusive, and even more preferably ranges from 1.5 to 5, inclusive.

A total thickness of the thickness T1 of the first dielectric layer and the thickness T2 of the second dielectric layer ranges, for example, from 7 nm to 500 nm, inclusive. From the viewpoint of increasing capacitance, the total thickness of T1 and T2 is preferably small, and for example, may range from 7 nm to 12.5 nm, inclusive, or from 7 nm to 10.5 nm, inclusive. When the dielectric layer is constituted by the first dielectric layer and the second dielectric layer, the thickness of the dielectric layer can be made small compared with the case where the dielectric layer is constituted by only the first dielectric layer, and thus the withstand voltage can be increased. The thickness T2 of the second dielectric layer ranges, for example, from 0.5 nm to 250 nm, inclusive.

Compositions of the oxide of the first metal included in the first dielectric layer and the oxide of the second metal included in the second dielectric layer can be determined by performing elemental analysis by energy dispersive X-ray spectroscopy (EDX) with respect to a cross section of the electrode foil.

The thickness T1 of the first dielectric layer and the thickness T2 of the second dielectric layer can be determined by observing the cross section of the electrode foil using a scanning electron microscope (SEM) or a transmission electron microscope (TEM). Specifically, the thicknesses of the first dielectric layer are measured at ten arbitrary points using a cross-sectional image of the electrode foil obtained by SEM or TEM, and an average value thereof is determined as thickness T1. The thicknesses of the second dielectric layer are also measured at ten arbitrary points, and an average value thereof is determined as thickness T2.

Hereinafter, one example of the electrode foil according to an exemplary embodiment of the present invention will be described with reference to FIG. 1. FIG. 1 is a sectional view schematically illustrating a surface portion of the electrode foil according to an exemplary embodiment of the present invention.

The electrode foil is anode foil 10 that includes anode body 110 including the first metal, and dielectric layer 120 covering at least a part of anode body 110. Dielectric layer 120 includes first dielectric layer 121 covering at least a part of anode body 110, and second dielectric layer 122 covering at least a part of first dielectric layer 121. First dielectric layer 121 includes an oxide of the first metal. Second dielectric layer 122 includes an oxide of the second metal. The second metal is different from the first metal. The thickness T2 of second dielectric layer 122 is smaller than the thickness T1 of first dielectric layer 121.

Anode body 110 is a metal foil having a surface roughened by etching or the like and including the first metal, and includes core part 111 and porous part 112. Porous part 112 has a large number of pits P. First dielectric layer 121 is formed up to surfaces of deepest portions of pits P by anodizing the metal foil. Second dielectric layer 122 is formed up to surfaces of deepest portions of pits P by an ALD method.

[Electrolytic Capacitor]

An electrolytic capacitor according to an exemplary embodiment of the present invention includes the electrode foil and a solid electrolyte layer covering at least a part of the second dielectric layer of the electrode foil. The solid electrolyte layer includes a conductive polymer (π-conjugated polymer). Examples of the conductive polymer include polypyrrole, polythiophene, polyaniline, and derivatives thereof.

The electrolytic capacitor may further include a solvent. The solvent preferably includes a glycol compound and/or a glycerin compound (hereinafter, also referred to as a glycol compound and the like). The glycol compound and the like may be contained in an electrolytic solution to be described later. When the solvent contains the glycol compound and the like, orientation or crystallinity of the π-conjugated polymer included in the solid electrolyte layer can be enhanced. As a result, conductivity of the solid electrolyte layer is improved, and an equivalent series resistance (ESR) of the electrolytic capacitor is lowered. In addition, contactivity between the solid electrolyte layer and the second dielectric layer is improved, and thus withstand voltage characteristics are improved.

Examples of the glycol compound include ethylene glycol, diethylene glycol, triethylene glycol, propylene glycol, and polyalkylene glycol having a molecular weight ranging approximately from 190 to 400. Examples of the glycerin compound include glycerin and polyglycerin. A polymerization degree of the polyglycerin preferably ranges from 2 to 20, inclusive. The glycol compound and the like may be used alone or in combination of two or more kinds thereof.

The electrolytic capacitor may further include an electrolytic solution. By using an electrolytic solution, an electrolytic capacitor that is excellent in a function of repairing the dielectric layer can be obtained. The electrolytic solution contains, for example, a solvent and an ionic substance (solute, e.g., organic salt) dissolved in the solvent.

The solvent may be an organic solvent or an ionic liquid. The solvent is preferably a high-boiling solvent. For example, carbonate compounds such as propylene carbonate, cyclic sulfones such as sulfolane, lactones such as γ-butyrolactone, amides such as N-methylacetamide, N,N-dimethylformamide, and N-methyl-2-pyrrolidone, esters such as methyl acetate, ethers such as 1,4-dioxane, ketones such as methyl ethyl ketone, formaldehyde, and the like can be used. The solvents may be used alone or in combination of two or more kinds thereof.

The organic salt is a salt in which at least one of an anion and a cation includes an organic substance. As the organic salt, for example, trimethylamine maleate, triethylamine borodisalicylate, ethyldimethylamine phthalate, mono-1,2,3,4-tetramethylimidazolinium phthalate, mono-1,3-dimethyl-2-ethyl imidazolinium phthalate, and the like may be used. The organic salts may be used alone or in combination of two or more kinds thereof.

The first dielectric layer is an anodizing film. From the viewpoint of forming the second dielectric layer, a rated voltage Vw (V) of the electrolytic capacitor and a ratio $T1/R$ of the thickness T1 (nm) of the first dielectric layer to an anodizing rate R (nm/V) for formation of the anodizing film preferably satisfy a relationship of $(T1/R)/Vw \leq 3$. $(T1/R)/Vw$ is more preferably less than or equal to 2.5, even more preferably less than or equal to 2.0, and particularly preferably less than or equal to 1.5. In this case, a thickness balance between the first dielectric layer and the second dielectric layer can be easily adjusted such that $T1/T2$ is more than 1 and less than or equal to 20. Thus, a good balance among an increase in withstand voltage, an increase in capacitance, and cost reduction can be easily realized. Note that the anodizing rate R means a thickness (nm) of the anodizing film (layer of the oxide of the first metal) formed per 1 volt of an anodizing voltage Vf.

The anodizing rate R varies depending on a metal type of the first metal. When the first metal is, for example, Al, the anodizing rate R is 1.4 nm/V (more product) or 2.0 nm/V (less product). Note that the electrolytic capacitor having the rated voltage Vw of less than or equal to 10 V is defined as the less product, and the electrolytic capacitor having the rated voltage Vw of more than 10 V is defined as the more product. When the first metal is Ta, the anodizing rate R is 2 nm/V.

[Method for Manufacturing Electrolytic Capacitor]

A method for manufacturing an electrolytic capacitor according to an exemplary embodiment of the present invention includes: a first step of forming a first dielectric layer including an oxide of a first metal by anodizing a base material including the first metal such that the first dielectric layer covers at least a part of the base material; and a second step of forming a second dielectric layer including an oxide of a second metal and having a thickness T2 smaller than a thickness T1 of the first dielectric layer such that the second dielectric layer covers at least a part of the first dielectric layer to obtain an electrode foil. The second metal is different from the first metal. The first metal includes at least one selected from the group consisting of Ti, Ta, Nb, and Al. The second metal includes at least one selected from the group consisting of Si, Zr, Hf, and Ta. The electrode foil can be obtained by the first step and the second step.

Hereinafter, each step will be described in detail.

(First Step)

By anodizing a base material including a first metal, a first dielectric layer including an oxide of the first metal is formed to cover at least a part of the base material. As the base material, a metal foil having a roughened surface is usually used. The metal foil may be a foil of the first metal or an alloy foil including the first metal. The thickness of the metal foil is not particularly limited, but ranges, for example, from 15 μm to 300 μm, inclusive. The roughening is made by etching treatment or the like. With the roughening, a plurality of pits are formed on a surface of the metal foil. The first dielectric layer can be formed up to surfaces of deepest portions of the pits by anodizing the metal foil.

In the first step, an anodizing voltage Vf is applied to the base material. The thickness T1 of the first dielectric layer varies depending on the anodizing voltage Vf. From the viewpoint of forming the second dielectric layer, a ratio Vf/Vw of the anodizing voltage Vf to a rated voltage Vw of the electrolytic capacitor is preferably less than or equal to 3.0, more preferably less than or equal to 2.5, even more preferably less than or equal to 2.0, and particularly preferably less than or equal to 1.5. In this case, a thickness balance between the first dielectric layer and the second dielectric layer can be easily adjusted such that $T1/T2$ is more than 1 and less than or equal to 20. Thus, a good balance among an increase in withstand voltage, an increase in capacitance, and cost reduction can be easily realized.

A method for anodizing the base material is not particularly limited. The method involves, for example, immersing the base material in an anodizing solution such as an ammonium adipate solution, and applying predetermined voltage Vf.

A pore diameter of each of the pits formed on the surface of the metal foil is not particularly limited, but preferably ranges from 50 nm to 2,000 nm. In this range, a surface area of the metal foil can be increased and the second dielectric layer is easily formed deep in the pits. The pore diameter of the pit is a most frequent pore diameter of a pore distribution measured by, for example, a mercury porosimeter. The depth of the pit is also not particularly limited, and may be set appropriately according to the thickness of the metal foil. In particular, from the viewpoint of increasing the surface area and maintaining strength of the electrode foil, the depth of the pit (thickness D of an etched region in which the pit is formed) preferably ranges from one tenth to four tenths, inclusive, of the thickness of the metal foil before being etched. Thickness D of the etched region is an average value of thicknesses at ten arbitrary points in a cross-sectional image of the metal foil obtained by SEM or TEM.

(Second step)

In the second step, a second dielectric layer that includes an oxide of a second metal and has a thickness T2 smaller than a thickness T1 of the first dielectric layer is formed to cover at least a part of the first dielectric layer. The second metal is different from the first metal. In the second step, the second dielectric layer is preferably formed such that a ratio $T1/T2$ of the thickness T1 of the first dielectric layer to the thickness T2 of the second dielectric layer is more than 1 and less than or equal to 20.

In the second step, the second dielectric layer is preferably formed by an atomic layer deposition method (ALD method). By using the ALD method, the second dielectric layer having a small and uniform thickness can be formed. In the second dielectric layer formed by the ALD method, a variation in thicknesses values at ten points, which are measured to obtain thickness T2, is small, and a standard deviation of the thicknesses values is, for example, less than or equal to 0.5 nm.

The ALD method is a film forming method for forming a layer (second dielectric layer) including an oxide of the second metal on the surface of an object by alternately supplying a source gas including the second metal and an oxidant to a reaction chamber in which the object is disposed. In the ALD method, since a self-limiting action occurs, the second metal is deposited on the surface of the object in a manner of atomic layer by atomic layer. Hence, the thickness of the second dielectric layer is controlled by a number of cycles. In each of the cycles, supply of the source gas, exhaust (purge) of the source gas, supply of the oxidant, and exhaust (purge) of the oxidant are performed in this order as one cycle. That is, the ALD method is a preferred method because the thickness of the layer to be formed can be easily controlled. Furthermore, the ALD method can be performed under a temperature condition ranging from 100° C. to 400° C., compared with a temperature condition of 400° C. to 900° C. for chemical vapor deposition (CVD). That is, the ALD method is also preferable because thermal damage to the metal foil can be suppressed.

With the ALD method, a thin film can be formed on a surface of a deep portion of a pit as long as the pore diameter of the pit is, for example, at least approximately 10 nm. As described above, the pit formed on the surface of the metal foil usually has a pore diameter of more than or equal to 50 nm. Thus, according to the ALD method, the second dielectric layer can be formed even on the surface of a deep portion of a deep pit having a small pore diameter, that is, of a deep portion of a pit having a large aspect ratio.

As the oxidant, an oxidant conventionally used in the ALD method can be used. Examples of the oxidant include water, oxygen, and ozone. The oxidant may be supplied to the reaction chamber as plasma using the oxidant as a raw material.

The second metal is supplied to the reaction chamber by gasifying a precursor including the second metal. The precursor is an organometallic compound including the second metal, and thus the second metal can be easily chemisorbed onto an object. As the precursor, various organometallic compounds, conventionally used in the ALD method, can be used.

Examples of a precursor including Si include N-sec-butyl (trimethylsilyl)amine ($C_7H_{19}NSi$), 1,3-diethyl-1,1,3,3-tetramethyldisilazane ($C_8H_{23}NSi_2$), 2,4,6,8,10-pentamethylcyclopentasiloxane (($CH_3SiHO)_5$), pentamethyldisilane (($CH_3)_3SiSi(CH_3)_2H$), tris(dimethylamino)silane ($[(CH_3)_2N]_3SiH$), tris(isopropoxy)silanol ($[(H_3C)_2CHO]_3SiOH$), chloropentamethyldisilane (($CH_3)_3SiSi(CH_3)_2Cl$), dichlorosilane ($SiH_2Cl_2$), tridimethylaminosilane ($Si[N(CH_3)_2]_4$), tetraethylsilane ($Si(C_2H_5)_4$), tetramethylsilane ($Si(CH_3)_4$), tetraethoxysilane ($Si(OC_2H_5)_4$), dodecamethylcyclohexasilane (($Si(CH_3)_2)_6$), silicon tetrachloride ($SiCl_4$), silicon tetrabromide ($SiBr_4$), bis(ethylmethylamino)silane ($H_2Si[N(C_2H_5)(CH_3)]_2$), bis(diethylamino)silane ($H_2Si[N(C_2H_5)_2]_2$), and bis tert-butyl amino silane ($H_2Si[NH(C_4H_9)]_2$).

Examples of a precursor including Ta include tris(ethylmethylamide)(t-butylimide)tantalum(V) Ta(N-t-$C_4H_9$[N($C_2H_5$)$CH_3$]$_3$), tantalum(V) ethoxide (Ta($OC_2H_5$)$_5$), tris(diethylamide)(t-butylimide)tantalum(V) (($CH_3)_3CNTa(N(C_2H_5)_2)_3$), and pentakis(dimethylamino)tantalum(V) (Ta(N($CH_3$)$_2$)$_5$).

Examples of a precursor including Ta include tris(ethylmethylamide)(t-butylimide)tantalum(V) Ta(N-t-$C_4H_9$[N($C_2H_5$)$CH_3$]$_3$), tantalum(V) ethoxide (Ta($OC_2H_5$)$_5$), tris(diethylamide)(t-butylimide)tantalum(V) (($CH_3)_3CNTa(N(C_2H_5)_2)_3$), and pentakis(dimethylamino)tantalum(V) (Ta(N($CH_3$)$_2$)$_5$).

(Third Step)

The method for manufacturing an electrolytic capacitor may include a third step of forming a solid electrolyte layer including a conductive polymer so as to cover at least a part of the second dielectric layer of the electrode foil. The solid electrolyte layer can be formed, for example, by subjecting a raw material monomer to chemical polymerization or electrolytical polymerization on the second dielectric layer of the electrode foil. Alternatively, the solid electrolyte layer may be formed by applying a solution in which the conductive polymer is dissolved or a dispersion liquid in which the conductive polymer is dispersed to the second dielectric layer of the electrode foil. After the third step (after the solid electrolyte layer is formed), the electrode foil may further be impregnated with a solvent or an electrolytic solution.

Figure 2:
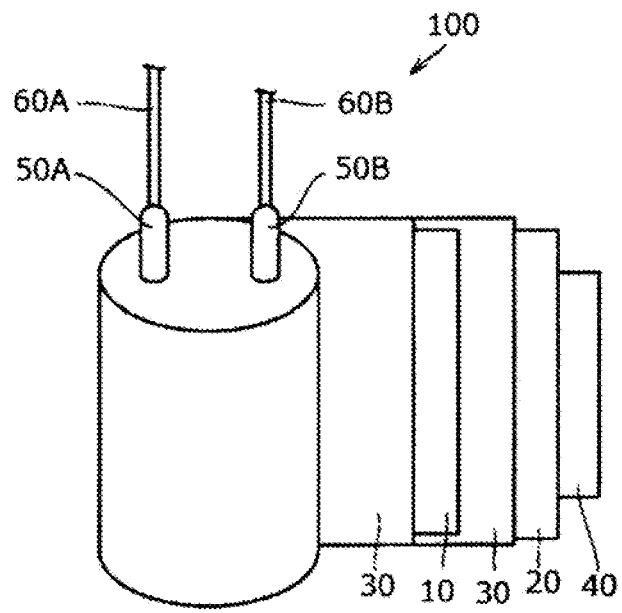
FIG. 2 is a perspective view schematically illustrating a configuration of a wound body included in an electrolytic capacitor according to an exemplary embodiment of the present invention.

When the anode body having the dielectric layer is an electrode foil (anode foil) as illustrated in FIG. 1, wound body 100 as illustrated in FIG. 2 may be produced before the third step. FIG. 2 is a developed view for explaining a configuration of wound body 100.

When wound body 100 is produced, cathode foil 20 is prepared in addition to anode foil 10. For cathode foil 20, a metal foil can be used similarly to anode foil 10. A type of the metal that constitutes cathode foil 20 is not particularly limited, but a valve metal, such as Al, Ta, or Nb, or an alloy including the valve metal can be used. A surface of cathode foil 20 may be roughened as necessary.

Next, anode foil 10 and cathode foil 20 are wound with separator 30 interposed therebetween. Ends on one side of lead tabs 50A and 50B are connected to anode foil 10 and cathode foil 20, respectively, and wound body 100 is formed while lead tabs 50A and 50B are being rolled in. Lead wires 60A and 60B are connected to ends on the other side of lead tabs 50A and 50B, respectively.

Separator 30 is not particularly limited, and for example, nonwoven fabric that includes cellulose, polyethylene terephthalate, vinylon, aramid fiber, or the like as a main component can be used.

Next, winding stop tape 40 is disposed on an outer surface of cathode foil 20 positioned at an outermost layer of wound body 100, and an end of cathode foil 20 is fixed with winding stop tape 40. When anode foil 10 is prepared by cutting a large foil, an anodizing treatment may further be performed on wound body 100 in order to provide the dielectric layer on a cutting surface.

The solid electrolyte layer is formed between anode foil 10 and cathode foil 20 by impregnating wound body 100 with a solution in which the conductive polymer is dissolved or a dispersion liquid in which the conductive polymer is dispersed. Wound body 100 in which the solid electrolyte layer has been formed may further be impregnated with a solvent or an electrolytic solution. Examples of a method for impregnation with a solution or the like include a method for immersing wound body 100 in the solution or the like stored in a container, and a method for dropping the solution or the like onto wound body 100. The impregnation may be performed in an atmosphere with a reduced pressure ranging, for example, from 10 kPa to 100 kPa, preferably from 40 kPa to 100 kPa.

Figure 3:
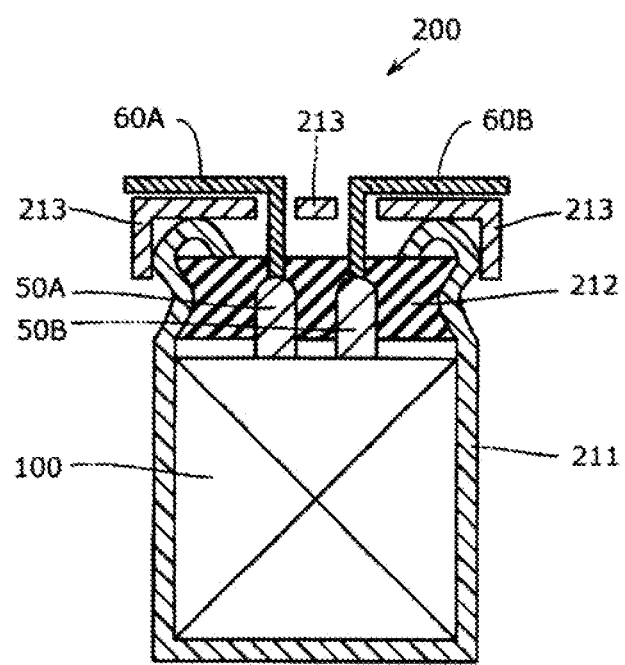
FIG. 3 is a sectional view schematically illustrating the electrolytic capacitor according to the exemplary embodiment of the present invention.

Next, wound body 100 is sealed, so that electrolytic capacitor 200 as illustrated in FIG. 3 is obtained. In order to manufacture electrolytic capacitor 200, wound body 100 is first housed in bottomed case 211 such that lead wires 60A and 60B are positioned on an opening side of bottomed case 211. As a material of bottomed case 211, a metal, such as aluminum, stainless steel, copper, iron, or brass, or an alloy thereof can be used.

Next, sealing member 212 formed such that lead wires 60A and 60B penetrate through is disposed above wound body 100, and wound body 100 is sealed in bottomed case 211. Sealing member 212 has only to be an insulating substance, and is preferably an elastic body. Among these materials, silicone rubber, fluororubber, ethylene propylene rubber, Hypalon™ rubber, butyl rubber, isoprene rubber, and the like, having high heat resistance, are preferable.

Next, a part near an opening end of bottomed case 211 is subjected to horizontal drawing, and is curled to swage the opening end toward sealing member 212. Finally, base plate 213 is disposed on the curled portion, which results in completion of the sealing. Thereafter, an aging treatment may be performed while a rated voltage is being applied.

In the above exemplary embodiment, a wound electrolytic capacitor has been described, but an application range of the present invention is not limited thereto. The present invention can also be applied to other electrolytic capacitors, for example, laminated electrolytic capacitors.

EXAMPLES

Hereinafter, the present invention will be described in more detail based on examples, but the present invention is not limited to the examples.

Example 1

A wound electrolytic capacitor (Φ (diameter) of 6.3 mm×L (length) of 9.9 mm) having rated voltage Vw of 2.0 V was produced. A specific method for manufacturing the electrolytic capacitor will be described below.
(Production of Anode Foil)

An aluminum foil having a thickness of 120 μm was prepared. The aluminum foil was subjected to direct current etching treatment to roughen a surface. An etched region having a thickness of 40 μm was formed on the surface of the aluminum foil. The pore diameter of the pit ranged from 100 nm to 200 nm, inclusive.

By subjecting the aluminum foil whose surface was roughened to an anodizing treatment, a first dielectric layer was formed to cover a surface of fine irregularities of the aluminum foil. The anodizing treatment was performed by immersing the aluminum foil in an ammonium adipate solution and applying anodizing voltage Vf to the aluminum foil. The anodizing voltage Vf was set to 5.0 V, and Vf/Vw was set to 2.5.

Then, a second dielectric layer was formed to cover the first dielectric layer by an ALD method (temperature: 300° C., precursor: tridimethylaminosilane, oxidant: O3, pressure: 1 Pa, 30 cycles). In this way, an anode body (anode foil) including the first dielectric layer and the second dielectric layer in this order on the surface was obtained. Thereafter, the anode foil was cut into a predetermined size.

It was confirmed by EDX analysis that the second dielectric layer was a $SiO_2$ layer and the first dielectric layer was an $Al_2O_3$ layer. Thickness T1 of the first dielectric layer and thickness T2 of the second dielectric layer, determined by the method described above, were 10 nm and 3 nm, respectively, and T1/T2 was 3.3. Since the second dielectric layer was formed by the ALD method, a variation in the measured values of the thicknesses of the second dielectric layer at ten points was small, and a standard deviation was 0.2 nm. The first metal was aluminum, anodizing rate R was 2.0 nm/V (less product), and (T1/R)/Vw was 2.5.
(Production of Cathode Foil)

An aluminum foil having a thickness of 50 μm was etched to roughen the surface of the aluminum foil, thereby obtaining a cathode foil. Thereafter, the cathode foil was cut into a predetermined size.
(Production of Wound Body)

An anode lead tab and a cathode lead tab were connected to the anode foil and the cathode foil, respectively. The anode foil and the cathode foil were wound with a separator interposed therebetween while the lead tabs were being rolled in. An anode lead wire and a cathode lead wire were connected to ends of the lead tabs protruding from the wound body, respectively. Then, the produced wound body was subjected to an anodizing treatment again to form a dielectric layer at a cutting end of the anode foil. Next, an end of an outer surface of the wound body was fixed with a winding stop tape.
(Preparation of Conductive Polymer Dispersion Liquid)

A mixed solution was prepared by dissolving 3,4-ethylenedioxythiophene and polystyrenesulfonic acid as a dopant in ion-exchanged water. While the obtained mixed solution was being stirred, iron(III) sulfate (oxidant) that had been dissolved in ion-exchanged water was added to the mixed solution to cause a polymerization reaction. After the reaction, the obtained reaction solution was dialyzed to remove unreacted monomers and an excessive oxidant, so that a conductive polymer dispersion liquid was obtained that contained approximately 5% by mass of polyethylenedioxythiophene doped with polystyrenesulfonic acid.
(Formation of Solid Electrolyte Layer)

The wound body was immersed in the conductive polymer dispersion liquid housed in a predetermined container in a decompressed atmosphere (40 kPa) for 5 minutes. Then, the wound body was picked up from the conductive polymer dispersion liquid. Next, the wound body that had been impregnated with the conductive polymer dispersion liquid was dried in a drying furnace at 150° C. for 20 minutes to form a solid electrolyte layer including the conductive polymer between the anode foil and the cathode foil.
(Sealing of Wound Body)

The wound body including the solid electrolyte layer was sealed to complete the electrolytic capacitor illustrated in FIG. 3. Then, an aging treatment was performed at 130° C. for 2 hours while rated voltage Vw was being applied.

EVALUATION

An electrostatic capacity of the obtained electrolytic capacitor was measured. A breakdown withstand voltage was also measured by applying a voltage at an increasing rate of 1.0 V/s until an excess current of 0.5 A flowed. The electrostatic capacity was expressed as an index (capacitance index C) where an electrostatic capacity of an electrolytic capacitor of Comparative Example 3 was 100. The breakdown withstand voltage was expressed as an index (breakdown withstand voltage index V) where a breakdown withstand voltage of the electrolytic capacitor of Comparative Example 3 was 100.

Examples 2 to 4 and Comparative Examples 1 to 2

Electrolytic capacitors were produced in the same way as in Example 1 except that thicknesses T2 of the second dielectric layers were set to the values shown in Table 1, and the electrolytic capacitors were evaluated. Thickness T2 of the second dielectric layer was controlled by changing the number of cycles in the ALD method.

Comparative Example 3

An electrolytic capacitor was produced in the same way as in Example 1 except that the second dielectric layers was not formed, and the electrolytic capacitor was evaluated.

Examples 5 to 6

Electrolytic capacitors were produced in the same way as in Example 1 except that thickness T1 of the first dielectric layer and thickness T2 of the second dielectric layer were set to the values shown in Table 1, and the electrolytic capacitors were evaluated. Thickness T1 of the first dielectric layer was controlled by changing an anodizing voltage Vf. Thickness T2 of the second dielectric layer was controlled by changing the number of cycles in the ALD method.

Table 1 shows evaluation results of the electrolytic capacitors of Examples 1 to 6 and Comparative Examples 1 to 3. Table 1 also shows CV values. The CV value is a value obtained by multiplying the electrostatic capacity by the breakdown withstand voltage, and indicates an amount of electricity that the electrolytic capacitor can store. In Table 1, the CV value was expressed as an index (CV index) where the CV value of Comparative Example 3 was 100.

In each of the electrolytic capacitors of Comparative Examples 1 to 2 in which T1/T2 was less than or equal to 1, the capacitance decreased, and the CV value was smaller than the electrolytic capacitor of Comparative Example 3.

Example 7

An electrolytic capacitor was produced in the same way as in Example 1 except that thickness T1 of the first dielectric layer was set to 5 nm, and the electrolytic capacitor was evaluated. Thickness T1 of the first dielectric layer was controlled by changing anodizing voltage Vf. It was confirmed by EDX analysis that the second dielectric layer was a $SiO_2$ layer.

Example 8

An electrolytic capacitor was produced in the same way as in Example 1 except that in producing an electrode foil, tetrakis(dimethylamino)zirconium(IV) was used as a precursor to be used in the ALD method, and the electrolytic capacitor was evaluated. It was confirmed by EDX analysis that the second dielectric layer was a $ZrO_2$ layer.

Example 9

An electrolytic capacitor was produced in the same way as in Example 1 except that in producing an electrode foil, tetrakisdimethylaminohafnium was used as a precursor to be

TABLE 1

| | First dielectric layer | | Second dielectric layer | | | | Withstand | |
| | Oxide of first metal | Thickness T1 (nm) | Oxide of second metal | Thickness T2 (nm) | T1/T2 | Capacitance index C | voltage index V | CV index |
|---|---|---|---|---|---|---|---|---|
| Comparative Example 1 | $Al_2O_3$ | 10 | $SiO_2$ | 14.3 | 0.7 | 15 | 500 | 75 |
| Comparative Example 2 | $Al_2O_3$ | 10 | $SiO_2$ | 10.0 | 1.0 | 24 | 400 | 96 |
| Example 2 | $Al_2O_3$ | 10 | $SiO_2$ | 9.1 | 1.1 | 28 | 380 | 106 |
| Example 1 | $Al_2O_3$ | 10 | $SiO_2$ | 3 | 3.3 | 54 | 200 | 108 |
| Example 3 | $Al_2O_3$ | 10 | $SiO_2$ | 0.5 | 20 | 88 | 120 | 106 |
| Example 4 | $Al_2O_3$ | 10 | $SiO_2$ | 0.4 | 25 | 90 | 112 | 101 |
| Example 5 | $Al_2O_3$ | 6 | $SiO_2$ | 2 | 3.0 | 110 | 115 | 127 |
| Example 6 | $Al_2O_3$ | 4 | $SiO_2$ | 3 | 1.3 | 100 | 120 | 120 |
| Comparative Example 3 | $Al_2O_3$ | 10 | — | 0 | — | 100 | 100 | 100 |

In each of the electrolytic capacitors of Examples 1 to 6 in which the second dielectric layer was formed, the withstand voltage was improved as compared with the electrolytic capacitor of Comparative Example 3 in which the second dielectric layer was not formed. In each of the electrolytic capacitors of Examples 1 to 6 in which T1/T2 was more than 1, a good balance between excellent withstand voltage and good capacitance was obtained, and the CV value was increased more than the electrolytic capacitor of Comparative Example 3.

In each of the electrolytic capacitors of Examples 1 to 3 and 5 to 6 in which T1/T2 was more than 1 and less than or equal to 20, the withstand voltage was further improved, and a larger CV value was obtained. In particular, in each of the electrolytic capacitors of Examples 5 to 6 in which the total thickness of T1 and T2 was small, a larger capacitance was obtained, and the CV value further increased.

used in the ALD method, and the electrolytic capacitor was evaluated. It was confirmed by EDX analysis that the second dielectric layer was an $HfO_2$ layer.

Example 10

An electrolytic capacitor was produced in the same way as in Example 1 except that in producing an electrode foil, pentakis(dimethylamino)tantalum(V) was used as a precursor to be used in the ALD method, and the electrolytic capacitor was evaluated. It was confirmed by EDX analysis that the second dielectric layer was a $Ta_2O_5$ layer.

Table 2 shows evaluation results of the electrolytic capacitors of Examples 7 to 10.

TABLE 2

|  | First dielectric layer | | Second dielectric layer | | | | Withstand |
|---|---|---|---|---|---|---|---|
|  | Oxide of first metal | Thickness T1 (nm) | Oxide of second metal | Thickness T2 (nm) | T1/T2 | Capacitance index C | voltage index V |
| Example 7 | $Al_2O_3$ | 5 | $SiO_2$ | 3 | 1.7 | 100 | 125 |
| Example 8 | $Al_2O_3$ | 7.5 | $ZrO_2$ | 3 | 2.5 | 105 | 110 |
| Example 9 | $Al_2O_3$ | 7.2 | $HfO_2$ | 3 | 2.4 | 110 | 103 |
| Example 10 | $Al_2O_3$ | 7.0 | $Ta_2O_5$ | 3 | 2.3 | 105 | 102 |

In each of the examples, an electrolytic capacitor, having a large capacitance and an excellent withstand voltage, was obtained. When the oxide of the second metal was $SiO_2$, a thin and dense second dielectric layer was formed, and the withstand voltage was further increased. When the oxide of the second metal was $HfO_2$, the capacitance was further increased.

The electrode foil according to the present invention improves capacitance and withstand voltage, so that it can be used in capacitors for various applications.

The invention claimed is:

1. An electrode foil for an electrolytic capacitor, the electrode foil comprising:
   an anode body including aluminum;
   a first dielectric layer covering at least a part of the anode body and including $Al_2O_3$; and
   a second dielectric layer covering at least a part of the first dielectric layer and including $SiO_2$, wherein:
   a thickness T2 of the second dielectric layer is smaller than a thickness T1 of the first dielectric layer,
   a total thickness of the thickness T1 of the first dielectric layer and the thickness T2 of the second dielectric layer ranges from 7 nm to 12.5 nm, inclusive, and
   a ratio T1/T2 of the thickness T1 of the first dielectric layer to the thickness T2 of the second dielectric layer is more than 1 and less than or equal to 20.

2. An electrolytic capacitor comprising:
   the electrode foil according to claim 1; and
   a solid electrolyte layer covering at least a part of the second dielectric layer of the electrode foil,
   wherein the solid electrolyte layer includes a conductive polymer.

3. The electrolytic capacitor according to claim 2, further comprising a solvent or an electrolytic solution.

4. The electrolytic capacitor according to claim 2, wherein:
   the first dielectric layer is an anodizing film, and
   a relationship of $(T1/R)/Vw \leq 3$ is satisfied,
   where T1/R is a ratio of the thickness T1 (nm) of the first dielectric layer to an anodizing rate R (nm/V) for formation of the anodizing film, and Vw is a rated voltage (V) of the electrolytic capacitor.

5. A method for manufacturing an electrolytic capacitor comprising:
   a first step of forming a first dielectric layer including $Al_2O_3$ by anodizing a base material including aluminum so that the first dielectric layer covers at least a part of the base material; and
   a second step of forming a second dielectric layer including $SiO_2$ and having a thickness T2 smaller than a thickness T1 of the first dielectric layer so that the second dielectric layer covers at least a part of the first dielectric layer to obtain an electrode foil, wherein:
   a total thickness of the thickness T1 of the first dielectric layer and the thickness T2 of the second dielectric layer ranges from 7 nm to 12.5 nm, inclusive, and
   in the second step, the second dielectric layer is formed so that a ratio T1/T2 of the thickness T1 of the first dielectric layer to the thickness T2 of the second dielectric layer is more than 1 and less than or equal to 20.

6. The method according to claim 5, wherein in the second stop, the second dielectric layer is formed by an atomic layer deposition method.

7. The method according to claim 5, wherein:
   in the first step, an anodizing voltage Vf is applied to the base material, and
   a ratio: Vf/Vw of the anodizing voltage Vf to a rated voltage Vw of the electrolytic capacitor is less than or equal to 3.

8. The method according to claim 5, further comprising a third step of forming a solid electrolyte layer including a conductive polymer so that the solid electrolyte layer covers at least a part of the second dielectric layer of the electrode foil.

9. The method according to claim 8, further comprising, after the third step, a step of impregnating the electrode foil with a solvent or an electrolytic solution.

* * * * *